US012078232B2

(12) United States Patent
Shin (10) Patent No.: US 12,078,232 B2
(45) Date of Patent: Sep. 3, 2024

(54) POWER TRANSMISSION DEVICE AND AUTOMOBILE INCLUDING THE SAME

(71) Applicant: HYUNDAI MOBIS CO., LTD., Seoul (KR)

(72) Inventor: Kyeong Ho Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/735,184

(22) Filed: May 3, 2022

(65) Prior Publication Data

US 2023/0279934 A1  Sep. 7, 2023

(30) Foreign Application Priority Data

Mar. 2, 2022 (KR) .................. 10-2022-0027006

(51) Int. Cl.
  *F16H 37/08* (2006.01)
(52) U.S. Cl.
  CPC .................. *F16H 37/082* (2013.01)
(58) Field of Classification Search
  CPC .... F16H 37/082; B60K 7/0007; B60K 17/046
  See application file for complete search history.

(56) References Cited

U.S. PATENT DOCUMENTS

| | | | | |
|---|---|---|---|---|
| 5,246,082 A * | 9/1993 | Alber | ................ | A61G 5/04 180/907 |
| 7,556,580 B2 * | 7/2009 | Saito | ................ | H02K 7/116 475/149 |
| 11,241,947 B2 * | 2/2022 | Suyama | ................ | F16H 1/46 |
| 11,358,468 B2 * | 6/2022 | Wang | ................ | H02K 7/1846 |
| 11,376,952 B1 * | 7/2022 | Shin | ................ | B60K 17/145 |
| 11,479,108 B2 * | 10/2022 | Iwabuchi | ............. | B60K 7/0007 |
| 2012/0202640 A1 | 8/2012 | Morimoto | | |
| 2017/0067512 A1 | 3/2017 | Nakawatari et al. | | |
| 2020/0384856 A1 * | 12/2020 | Wang | ................ | H02K 7/1025 |

FOREIGN PATENT DOCUMENTS

| | | |
|---|---|---|
| CN | 103867684 A | 6/2014 |
| EP | 1 600 324 A1 | 11/2005 |
| EP | 3 584 102 A1 | 12/2019 |
| JP | 2001-32888 A | 2/2001 |
| JP | 2007-191019 A | 8/2007 |
| JP | 2013-82321 A | 5/2013 |

(Continued)

OTHER PUBLICATIONS

Extended European Search Report issued on Aug. 2, 2022, in counterpart European Patent Application No. 22171296.1 (15 Pages in English).

(Continued)

*Primary Examiner* — Derek D Knight
(74) *Attorney, Agent, or Firm* — NSIP Law (57) ABSTRACT

A power transmission device include a motor including a rotary shaft, a first decelerator, coupled to the rotary shaft of the motor, configured to receive power from the rotary shaft, a second decelerator, coupled to the first decelerator, configured to receive the power from the first decelerator, and a wheel bearing coupled to one side of the second decelerator. A portion of the first decelerator is configured to insert into the rotary shaft and couple thereto.

15 Claims, 5 Drawing Sheets

(56) References Cited

FOREIGN PATENT DOCUMENTS

| KR | 10-1007069 B1 | 1/2011 |
|---|---|---|
| KR | 10-1871161 B1 | 6/2018 |
| WO | WO 2013/047695 A1 | 4/2013 |
| WO | WO 2019/074119 A1 | 4/2019 |

OTHER PUBLICATIONS

Extended European Search Report Issued on Nov. 17, 2022, in counterpart European Patent Application No. 22171296.1 (14 Pages in English).
Korean Office Action Issued on Dec. 17, 2023, in Counterpart Korean Patent Application No. 10-2022-0027006 (8 Pages in Korean).

* cited by examiner

POWER TRANSMISSION DEVICE AND AUTOMOBILE INCLUDING THE SAME

CROSS-REFERENCE TO RELATED APPLICATION(S)

This application claims the benefit under 35 USC 119(a) of Korean Patent Application No. 10-2022-0027006, filed on Mar. 2, 2022, in the Korean Intellectual Property Office, the entire disclosure of which is incorporated herein by reference for all purposes.

TECHNICAL FIELD

The following description relates to a power transmission device and an automobile including the power transmission device.

BACKGROUND

In-wheel systems are systems, in which motors providing rotational force are mounted inside wheels, and can reduce the volume occupied by components that drive wheels. These in-wheel systems are generally classified as a direct driving type, in which as a motor is directly connected to a wheel, rotational force of the motor is directly transmitted to the wheel, an indirect driving type, in which rotational force of a motor is transmitted to a wheel via a decelerator. Among these types, in case of an indirect driving-type in-wheel system, the rotational force of the motor is transmitted to the wheel via the decelerator, and thus torque can increase. Therefore, a motor having a relatively small output can be mounted.

Meanwhile, in order to increase the output torque transmitted to the wheel in the indirect driving-type in-wheel system, it is necessary to mount a decelerator capable of achieving a large speed reduction ratio. However, according to the related art, due to the volume occupied by the decelerator in the in-wheel system, there is a limit to the speed reduction ratio that can be achieved by the indirect driving-type in-wheel system. In particular, when two or more decelerators are provided in the in-wheel system to achieve a large speed reduction ratio, the size of the in-wheel system in the width direction becomes excessively increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power transmission device include a motor including a rotary shaft, a first decelerator, coupled to the rotary shaft of the motor, configured to receive power from the rotary shaft, a second decelerator, coupled to the first decelerator, configured to receive the power from the first decelerator, and a wheel bearing coupled to one side of the second decelerator. A portion of the first decelerator is configured to insert into the rotary shaft and couple thereto.

The first decelerator may include a first shaft member having a partial region configured to insert into the rotary shaft and couple thereto, and a first sun gear fixed to the first shaft member.

The first decelerator further may include a first planetary gear disposed on an outer surface of the first sun gear in a radial direction and configured to engage with the first sun gear, a first ring gear disposed on an outer surface of the first planetary gear in the radial direction and configured to engage with the first planetary gear, and a first carrier coupled to the first planetary gear.

The first shaft member and the first sun gear may be integrally formed.

The second decelerator may include a second shaft member fixed to the first carrier and coupled thereto, and a second sun gear fixed to the second shaft member.

The second decelerator further may include a second planetary gear disposed on an outer surface of the second sun gear in the radial direction (R) and configured to engage with the second sun gear, a second ring gear disposed on an outer surface of the second planetary gear in the radial direction (R) and configured to engage with the second planetary gear, and a second carrier coupled to the second planetary gear. The second shaft member and the second sun gear may be formed separately from each other.

The wheel bearing may include an inner race fixed to an outer surface of the second ring gear in the radial direction, an outer race disposed on an outer surface of the inner race in the radial direction, and a rolling body disposed between the inner race and the outer race. Each of the second shaft member, the second sun gear, the second planetary gear, and the second ring gear may overlap with the inner race and the outer race in a width direction perpendicular to the radial direction.

Centers of the first decelerator and the second decelerator in a radial direction may be positioned on a virtual axis extending along a longitudinal direction of the rotary shaft.

The first sun gear and the second sun gear may include a first helical gear region and a second helical gear region, respectively. A helix angle of the first helical gear region and a helix angle of the second helical gear region may be formed in opposite directions.

The helix angle of the first helical gear region and the helix angle of the second helical gear region may be formed symmetrically to each other.

The power transmission device may further include a housing member configured to accommodate the first decelerator. The first ring gear may be fixed and coupled to the housing member.

The second ring gear may be fixed and coupled to the inner race.

The power transmission device may further include a bolt member configured to pass through the inner race and the housing member and fix the inner race to the housing member.

The power transmission device may further include a brake disc assembly disposed on one side of the second decelerator, and a fastening member configured to pass through the second carrier and the brake disc assembly and fix the second carrier to the brake disc assembly.

Each of the first decelerator and the second decelerator may be accommodated in an inner space of the brake disc assembly.

A spline region may be formed in an inner surface of the first carrier, and the second shaft member may be inserted into the spline region and fixed thereto.

The power transmission device may further include a first support bearing disposed on one side of the first sun gear in a width direction perpendicular to the radial direction. The first sun gear may be accommodated in an inner space of the first carrier and faces the spline region in the width direction.

A maximum outer diameter of the first support bearing in the radial direction may be less than or equal to a maximum inner diameter of the spline region in the radial direction.

The power transmission device may further include a second support bearing disposed on an outer surface of the second shaft member in the radial direction and disposed on one side of the second sun gear. A maximum outer diameter of the second support bearing in the radial direction may be greater than a maximum outer diameter of the second sun gear in the radial direction.

In another general aspect, an automobile includes a wheel, and a power transmission device coupled to the wheel. The power transmission device includes a motor comprising a rotary shaft, a first decelerator, coupled to the rotary shaft of the motor, configured to receive power from the rotary shaft, a second decelerator, coupled to the first decelerator, configured to receive the power from the first decelerator, and a wheel bearing coupled to one side of the second decelerator. A portion of the first decelerator is configured to insert into the rotary shaft and couple thereto.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, a power transmission device and an automobile according to the present disclosure are described with reference to the drawings.

Power Transmission Device

Figure 1:
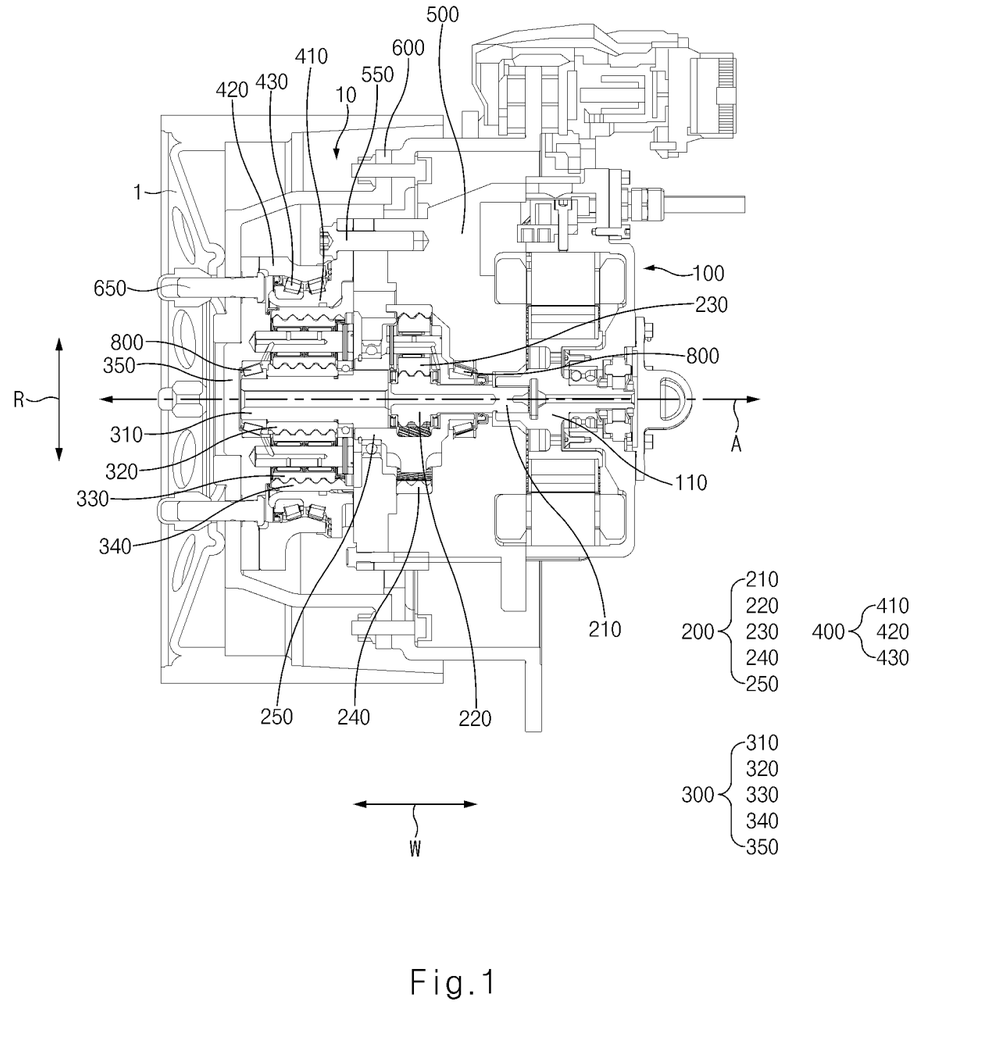
FIG. 1 is a cross-sectional view illustrating a power transmission device and a wheel according to the present disclosure.
Figure 2:
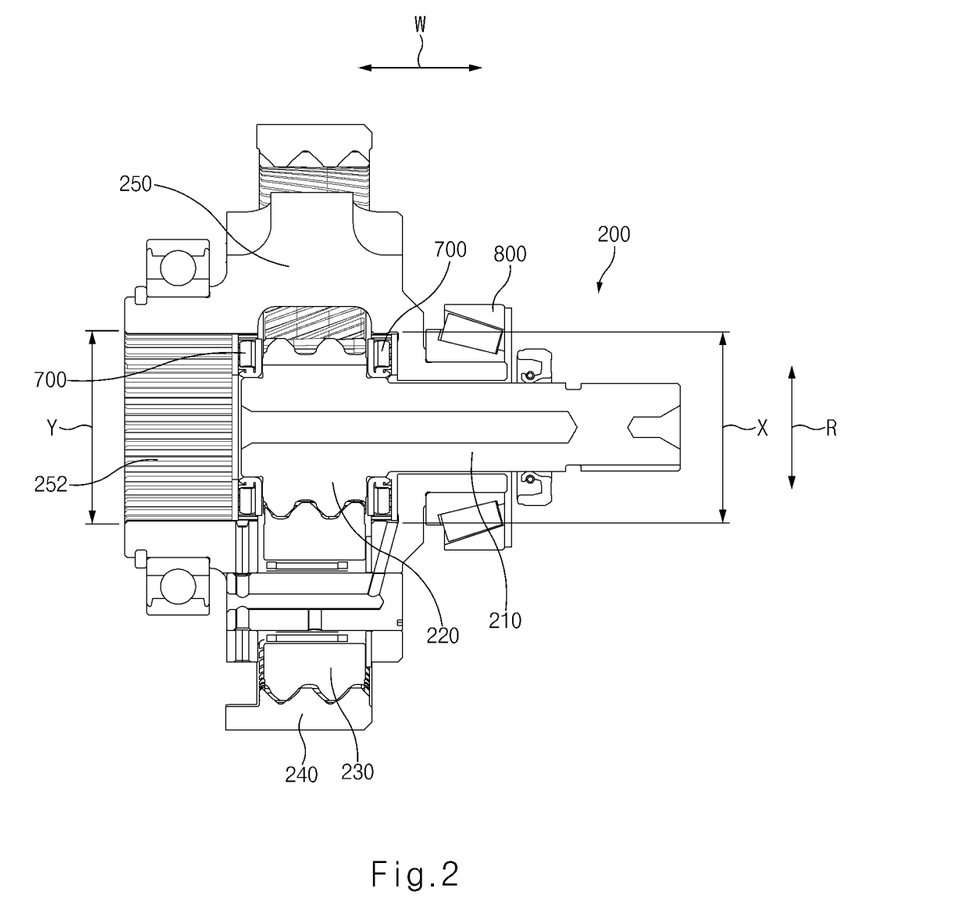
FIG. 2 is a cross-sectional view illustrating structures of a first decelerator and peripheral components of the power transmission device according to the present disclosure.
Figure 3:
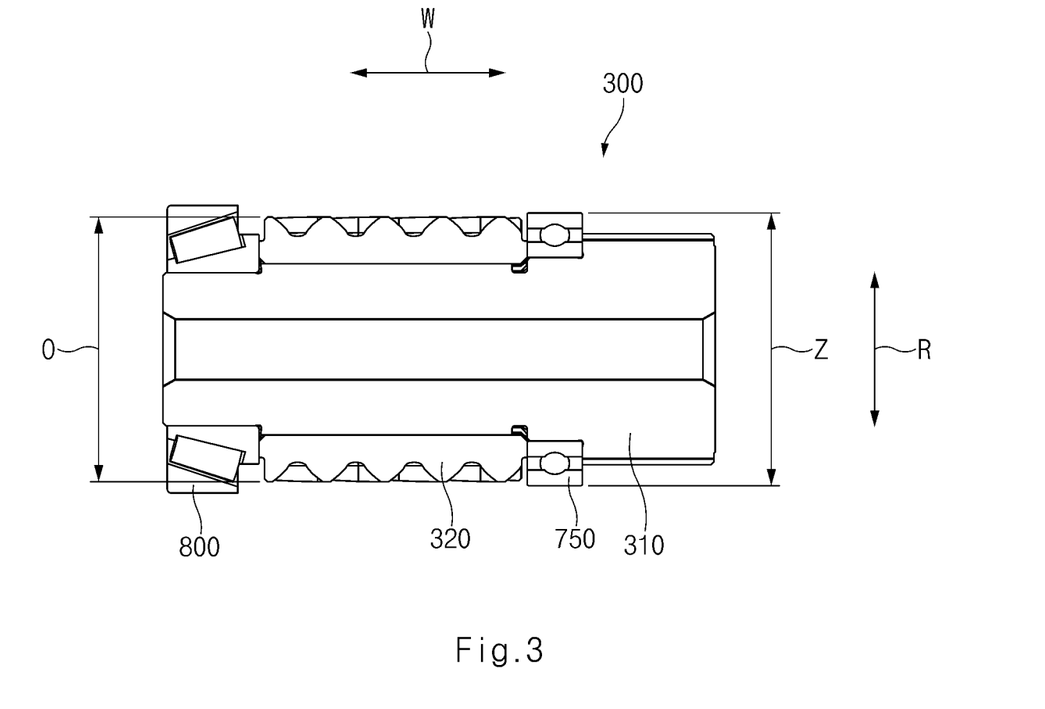
FIG. 3 is a cross-sectional view illustrating structures of a second shaft member and a second sun gear, which are provided in a second decelerator, and peripheral components in the power transmission device according to the present disclosure.
Figure 4:
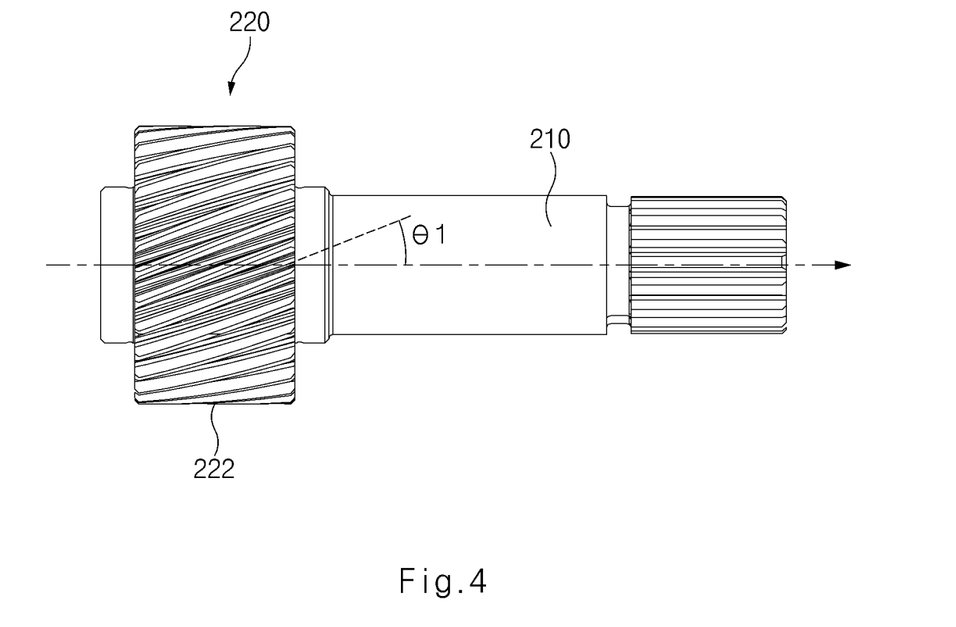
FIG. 4 is a side view illustrating a first shaft member and a first sun gear which are provided in the first decelerator of the power transmission device according to the present disclosure.
Figure 5:
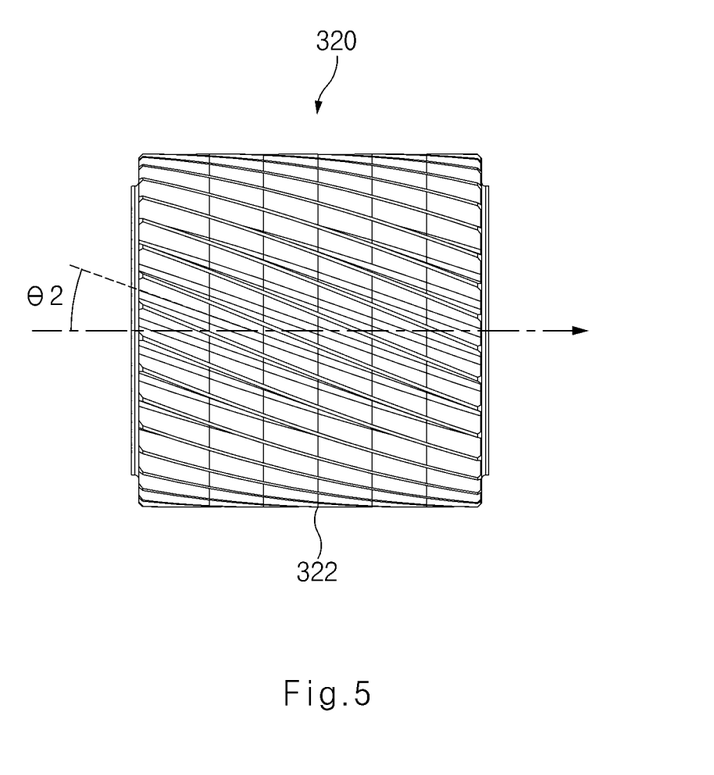
FIG. 5 is a side view illustrating the second sun gear provided in the second decelerator of the power transmission device according to the present disclosure.

FIG. 1 is a cross-sectional view illustrating a power transmission device and a wheel according to the present disclosure, and FIG. 2 is a cross-sectional view illustrating structures of a first decelerator and peripheral components of the power transmission device according to the present disclosure. FIG. 3 is a cross-sectional view illustrating structures of a second shaft member and a second sun gear, which are provided in a second decelerator, and peripheral components in the power transmission device according to the present disclosure, and FIG. 4 is a side view illustrating a first shaft member and a first sun gear which are provided in the first decelerator of the power transmission device according to the present disclosure. Also, FIG. 5 is a side view illustrating the second sun gear provided in the second decelerator of the power transmission device according to the present disclosure.

Referring to FIG. 1, a power transmission device 10 according to the present disclosure may include a motor 100 including a rotary shaft 110, a first decelerator 200 coupled to the rotary shaft 110 of the motor 100 and receiving power from the rotary shaft 110, and a second decelerator 300 coupled to the first decelerator 200 and receiving the power from the first decelerator 200. That is, according to the present disclosure, two decelerators 200 and 300 may be provided in the power transmission device 10. A rotation speed may be reduced firstly as the power is transmitted from the rotary shaft 110 of the motor 100 to the first decelerator 200, and the rotation speed may be reduced secondly as the power is transmitted from the first decelerator 200 to the second decelerator 300. More specifically, both the first decelerator 200 and the second decelerator 300 may be provided on one side of the motor 100. FIG. 1 illustrates, as one example, a state in which both the first decelerator 200 and the second decelerator 300 are provided on the left side of the motor 100.

Also, the power transmission device 10 may further include a wheel bearing 400 coupled to one side of the second decelerator 300. In one example, the power transmission device 10 according to the present disclosure may be configured to transmit a driving force to the wheel 1.

Meanwhile, according to the present disclosure, a portion of the first decelerator 200 may be inserted into the rotary shaft 110 and coupled thereto. More specifically, referring to FIG. 1, a groove having a shape recessed along the extension direction of the rotary shaft 110 of the motor 100 may be formed in the rotary shaft 110, and a portion of the first decelerator 200 may be inserted into the groove and coupled thereto.

As described above, in a case where a portion of the first decelerator 200 is inserted into the rotary shaft 110 and coupled thereto, not only can sealability inside the first decelerator 200 be enhanced, but also assemblability of the power transmission device 10 can be enhanced because the first decelerator 200 can be modularized, when compared to a case where a rotary shaft is inserted into a first decelerator and coupled thereto. Effects obtained by those described above will be described later.

Continuing to refer to FIGS. 1 and 2, the first decelerator 200 may include: a first shaft member 210, a partial region of which is inserted into the rotary shaft 110 and coupled thereto; and a first sun gear 220 fixed to the first shaft member 210. More specifically, the first sun gear 220 may be fixed to the outer surface of the first shaft member 210 in a radial direction R. Meanwhile, in the specification, the radial direction R is defined as a direction that is perpendicular to a direction in which the rotary shaft 110 extends, and a width direction W is defined as the direction in which the rotary shaft 110 extends, that is, a direction perpendicular to the radial direction R. In one example, the first shaft member 210 and the first sun gear 220 may be integrally formed. In this case, it may be advantageous in terms of enhancing the sealability inside the first decelerator 200. However, unlike that described above, the first shaft member 210 and the first sun gear 220 may be configured to be separate from each other.

The first decelerator 200 may further include: a first planetary gear 230 provided on the outside of the first sun gear 220 in the radial direction R and engaging with the first sun gear 220; a first ring gear 240 provided on the outside of the first planetary gear 230 in the radial direction R and engaging with the first planetary gear 230; and a first carrier 250 coupled to the first planetary gear 230.

According to the present disclosure on the basis of the above description, the first shaft member 210 is inserted into the rotary shaft 110 of the motor 100 and coupled thereto, and thus a region, in which the motor 100 and the first shaft member 210 are coupled, may be spaced apart from other components of the first decelerator 200, such as the first sun gear 220, the first planetary gear 230, the first ring gear 240, and the first carrier 250. Thus, compared to a case where a rotary shaft of a motor is directly coupled to a first sun gear, the other components of the first decelerator 200 may be further spaced apart from the motor 100, and thus the sealability of the other components of the first decelerator 200 from the outside may be further enhanced. Also, coupling and uncoupling between the motor 100 and the first decelerator 200 may be established only with coupling and uncoupling between the first shaft member 210 and the rotary shaft 110, and thus modularization of the first decelerator 200 may be achieved. Meanwhile, the rotational force of the rotary shaft 110 may be transmitted to the first sun gear 220 via the first shaft member 210, and the rotational force of the first sun gear 220 may be transmitted to the first carrier 250 via the first planetary gear 230. Thus, during this transmission, a speed reduction in the rotation speed may be established. The description of the speed reduction process of the rotation speed is replaced with the driving principle of a planetary gear decelerator widely known in the related art.

Continuing to refer to FIGS. 1 and 3, the second decelerator 300 may include: a second shaft member 310 fixed to the first carrier 250 and coupled thereto; and a second sun gear 320 fixed to the second shaft member 310. Thus, the rotational force of the first carrier 250 may be transmitted to the second sun gear 320 via the second shaft member 310. In one example, as illustrated in FIG. 1, the second shaft member 310 may be inserted into the first carrier 250 and coupled thereto.

In addition, the second decelerator 300 may include: a second planetary gear 330 provided on the outside of the second sun gear 320 in the radial direction R and engaging with the second sun gear 320; a second ring gear 340 provided on the outside of the second planetary gear 330 in the radial direction R and engaging with the second planetary gear 330; and a second carrier 350 coupled to the second planetary gear 330. Here, according to one example of the present disclosure, the second shaft member 310 and the second sun gear 320 may be formed separately from each other. Meanwhile, the rotational force of the first carrier 250 may be transmitted to the second sun gear 320 via the second shaft member 310, and the rotational force of the second sun gear 320 may be transmitted to the second carrier 350 via the second planetary gear 330. Thus, during this transmission, a speed reduction in the rotation speed may be established. The description of the speed reduction process of the rotation speed is replaced with the driving principle of a planetary gear decelerator widely known in the related art.

Meanwhile, as illustrated in FIG. 1, the wheel bearing 400 may include: an inner race 410 fixed to the outside of the second ring gear 340 in the radial direction R; an outer race 420 provided on the outside of the inner race 410 in the radial direction R; and a rolling body 430 provided between the inner race 410 and the outer race 420.

Here, according to the present disclosure, the second decelerator 300 is provided inside the wheel bearing 400 in the radial direction R, and the second decelerator 300 and the wheel bearing 400 may overlap with each other in the width direction W. More specifically, referring to FIG. 1, each of the second shaft member 310, the second sun gear 320, the second planetary gear 330, and the second ring gear 340 may overlap with the inner race 410 and the outer race 420 in the width direction W perpendicular to the radial direction R. Thus, according to the present disclosure, spaces occupied by the second decelerator 300 and the wheel bearing 400 in the power transmission device 10 may be minimized.

Continuing to refer to FIG. 1, the motor 100, the first decelerator 200, and the second decelerator 300, which are provided in the power transmission device 10 according to the present disclosure, may be arranged coaxially with each other. That is, according to the present disclosure, the center of the first decelerator 200 in the radial direction R and the center of the second decelerator 300 in the radial direction R may be positioned on a virtual axis A extending along the longitudinal direction of the rotary shaft 110. This can be understood as that the rotary shaft 110, the first shaft member 210, the second shaft member 310 are arranged on a straight line.

FIG. 4 is a side view illustrating the first shaft member and the first sun gear which are provided in the first decelerator of the power transmission device according to the present disclosure, and FIG. 5 is a side view illustrating the second sun gear provided in the second decelerator of the power transmission device according to the present disclosure.

Referring to FIGS. 4 and 5, each of the first sun gear 220 and the second sun gear 320 in the power transmission device 10 according to the present disclosure may include a helical gear region. A helical gear represents a gear having a shape in which gear teeth formed on the outer surface of the gear are inclined relative to the axial direction. More specifically, the first sun gear 220 may include a first helical gear region 222, and the second sun gear 320 may include a second helical gear region 322.

As described above, the helical gear is formed such that the gear teeth are inclined relative to the axial direction of the gear, and thus the gear teeth of the helical gear may have a certain angle with respect to the axial direction. In the specification, the angle formed between the gear teeth and the axial direction of the helical gear is defined as a helix angle.

Here, according to the present disclosure, a helix angle $\theta 1$ of the first helical gear region 222 and a helix angle $\theta 2$ of the second helical gear region 322 may be formed in opposite directions to each other. This may be understood as that a direction, in which gear teeth in the first helical gear region 222 are twisted relative to the axial direction of the first sun gear 220, is opposite to a direction, in which gear teeth in the second helical gear region 322 are twisted relative to the axial direction of the second sun gear 320. This may be to cancel out an axial force generated by the first helical gear region 222 when the first sun gear 220 rotates and an axial force generated by the second helical gear region 322 when the second sun gear 320 rotates, thereby reducing loads applied to axial force support bearings 800 which are provided near the first decelerator 200 and the second decelerator 300 and will be described later. In one example, the helix angle $\theta 1$ of the first helical gear region 222 and the helix angle $\theta 2$ of the second helical gear region 322 may be formed symmetrically to each other. This may be understood as that two helix angles are formed in opposite directions, and the sizes of these two helix angles are the same or correspond to each other.

Meanwhile, according to the present disclosure, the first ring gear 240 and the second ring gear 340 may be fixed without rotation during a process in which the rotational force of the motor 100 is transmitted to the second decelerator 300 via the first decelerator 200.

More specifically, continuing to refer to FIG. 1, the power transmission device 10 according to the present disclosure may further include a housing member 500 that accommodates the first decelerator 200. Here, the first ring gear 240 may be fixed and coupled to the housing member 500. Also, the second ring gear 340 may be fixed and coupled to the inner race 410 of the wheel bearing 400.

In addition, the power transmission device 10 may further include a bolt member 550 which passes through the inner race 410 and the housing member 500 and fixes the inner race 410 to the housing member 500. Thus, according to the present disclosure, the second ring gear 340 may be fixed to the housing member 500 via the inner race 410.

Meanwhile, the power transmission device 10 according to the present disclosure as described above may be configured to provide a driving force to a wheel 1 provided in an automobile. Furthermore, the power transmission device 10 may further include a component that provides the wheel 1 with a braking force.

More specifically, the power transmission device 10 may further include: a brake disc assembly 600 provided on one side of the second decelerator 300; and a fastening member 650 which passes through the second carrier 350 and the brake disc assembly 600 and fixes the second carrier 350 to the brake disc assembly 600. Here, as illustrated in FIG. 1, according to one example of the present disclosure, each of the first decelerator 200 and the second decelerator 300 may be accommodated in an inner space of the brake disc assembly 600.

Meanwhile, referring to FIGS. 2 and 3, a spline region 252 may be formed in an inner surface of the first carrier 250, and the second shaft member 310 may be inserted into the spline region 252 and fixed thereto. Accordingly, the second shaft member 310 and the first carrier 250 may be coupled and fixed to each other.

Also, the first sun gear 220 is accommodated in an inner space of the first carrier 250 and may face the spline region 252 described above in the width direction W. In addition, as illustrated in FIG. 2, the power transmission device 10 according to the present disclosure may further include a first support bearing 700 which is provided on one side of the first sun gear 220 in the width direction W and provided on the outside of the first shaft member 210 in the radial direction R. In one example, the first support bearing 700 may be a thrust bearing.

Here, according to the present disclosure, the maximum outer diameter X of the first support bearing 700 described above in the radial direction R may be less than or equal to the maximum inner diameter Y of the spline region 252 in the radial direction R. The first support bearing 700 may be located inside the first carrier 250 via the spline region 252, and the first support bearing 700 may be more easily mounted when the maximum outer diameter X of the first support bearing 700 in the radial direction R is less than the maximum inner diameter Y of the spline region 252 in the radial direction R as described above. Meanwhile, first support bearings 700 may be provided on both sides of the first sun gear 220 in the width direction W.

Continuing to refer to FIG. 3, the power transmission device 10 may further include a second support bearing 750 which is provided on the outside of the second shaft member 310 in the radial direction R. In one example, the second support bearing 750 may be a thrust bearing. More specifically, the second support bearing 750 may be provided on one side of the second sun gear 320 in the width direction W. Here, according to the present disclosure, the maximum outer diameter Z of the second support bearing 750 described above in the radial direction R may be greater than the maximum outer diameter O of the second sun gear 320 in the radial direction R. Meanwhile, the second support bearing 750 may be provided between the second sun gear 320 and the first carrier 250 in the width direction W (see FIGS. 1 and 3).

Also, the power transmission device 10 may further include an axial force support bearing 800 for supporting an axial force generated by the driving of the first decelerator 200 and the second decelerator 300. More specifically, as illustrated in FIGS. 1 to 3, one of axial force support bearings 800 may be provided between the first carrier 250 and the housing member 500 in the width direction W and the radial direction R, and another one may be further provided between the second sun gear 320 and the second carrier 350 in the width direction W.

Automobile

An automobile according to the present disclosure may include: a power transmission device 10; and a wheel 1 to which the power transmission device 10 is coupled.

Here, the power transmission device 10 may include: a motor 100 including a rotary shaft 110; a first decelerator 200 coupled to the rotary shaft 110 of the motor 100 and receiving power from the rotary shaft 110; a second decelerator 300 coupled to the first decelerator 200 and receiving the power from the first decelerator 200; and a wheel bearing 400 coupled to one side of the second decelerator 300. A portion of the first decelerator 200 may be inserted into the rotary shaft 110 and coupled thereto.

Meanwhile, the contents described above with respect to the power transmission device of the present disclosure may also be applied, in the same manner, to the automobile according to the present disclosure.

According to the present disclosure, the space occupied by the plurality of decelerators in the indirect driving-type in-wheel system may be minimized, thereby reducing the size of the in-wheel system and achieving the large speed reduction ratio.

Although the present disclosure has been described with specific embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:
1. A power transmission device comprising:
a motor comprising a rotary shaft;
a first decelerator coupled to the rotary shaft and configured to receive power from the rotary shaft, the first decelerator comprising:
  a first shaft member including a partial region inserted into the rotary shaft and coupled thereto,
  a first sun gear fixed to the first shaft member,
  a first planetary gear engaging the first sun gear, and
  a first carrier coupled to the first planetary gear;
a second decelerator coupled to the first decelerator and configured to receive power from the first decelerator, the second decelerator comprising:
  a second shaft member fixed to the first carrier and coupled thereto;

a second sun gear fixed to the second shaft member;
a second planetary gear disposed on an outer surface of the second sun gear in a radial direction and configured to engage with the second sun gear;
a second ring gear disposed on an outer surface of the second planetary gear in the radial direction and configured to engage with the second planetary gear; and
a second carrier coupled to the second planetary gear;
a wheel bearing coupled to one side of the second decelerator;
a brake disc assembly disposed on one side of the second decelerator; and
a fastening member configured to pass through the second carrier and the brake disc assembly and fix the second carrier to the brake disc assembly,
wherein the first planetary gear is disposed on an outer surface of the first sun gear in a radial direction and configured to engage with the first sun gear, and
wherein the first decelerator further comprises a first ring gear disposed on an outer surface of the first planetary gear in the radial direction, the first ring gear configured to engage with the first planetary gear.

2. The power transmission device of claim 1, wherein the first shaft member and the first sun gear are integrally formed.

3. The power transmission device of claim 1, wherein the second shaft member and the second sun gear are formed separately from each other.

4. The power transmission device of claim 1,
wherein the wheel bearing comprises:
an inner race fixed to an outer surface of the second ring gear in the radial direction;
an outer race disposed on an outer surface of the inner race in the radial direction; and
a rolling body disposed between the inner race and the outer race, and
wherein each of the second shaft member, the second sun gear, the second planetary gear, and the second ring gear overlaps with the inner race and the outer race in a width direction perpendicular to the radial direction.

5. The power transmission device of claim 4, further comprising:
a housing member configured to accommodate the first decelerator,
wherein the first ring gear is fixed and coupled to the housing member.

6. The power transmission device of claim 5, wherein the second ring gear is fixed and coupled to the inner race.

7. The power transmission device of claim 6, further comprising a bolt member configured to pass through the inner race and the housing member and fix the inner race to the housing member.

8. The power transmission device of claim 1, wherein centers of the first decelerator and the second decelerator in the radial direction are positioned on a virtual axis extending along a longitudinal direction of the rotary shaft.

9. The power transmission device of claim 1,
wherein the first sun gear and the second sun gear comprises a first helical gear region and a second helical gear region, respectively, and
wherein a helix angle of the first helical gear region and a helix angle of the second helical gear region are formed in opposite directions.

10. The power transmission device of claim 9, wherein the helix angle of the first helical gear region and the helix angle of the second helical gear region are formed symmetrically to each other.

11. The power transmission device of claim 1, wherein each of the first decelerator and the second decelerator is accommodated in an inner space of the brake disc assembly.

12. The power transmission device of claim 1,
wherein a spline region is formed in an inner surface of the first carrier, and
wherein the second shaft member is inserted into the spline region and fixed thereto.

13. The power transmission device of claim 12, further comprising:
a first support bearing disposed on one side of the first sun gear in a width direction perpendicular to the radial direction,
wherein the first sun gear is accommodated in an inner space of the first carrier and faces the spline region in the width direction, and
wherein a maximum outer diameter of the first support bearing in the radial direction is less than or equal to a maximum inner diameter of the spline region in the radial direction.

14. The power transmission device of claim 1, further comprising:
a second support bearing disposed on an outer surface of the second shaft member in the radial direction and disposed on one side of the second sun gear,
wherein a maximum outer diameter of the second support bearing in the radial direction is greater than a maximum outer diameter of the second sun gear in the radial direction.

15. An automobile comprising:
a wheel; and
a power transmission device coupled to the wheel, the power transmission comprising:
a motor comprising a rotary shaft;
a first decelerator coupled to the rotary shaft of the motor and configured to receive power from the rotary shaft, the first decelerator comprising:
a first shaft member including a partial region inserted into the rotary shaft and coupled thereto,
a first sun gear fixed to the first shaft member,
a first planetary gear engaging the first sun gear, and
a first carrier coupled to the first planetary gear;
a second decelerator coupled to the first decelerator and configured to receive power from the first decelerator, the second decelerator comprising:
a second shaft member fixed to the first carrier and coupled thereto;
a second sun gear fixed to the second shaft member;
a second planetary gear disposed on an outer surface of the second sun gear in a radial direction and configured to engage with the second sun gear;
a second ring gear disposed on an outer surface of the second planetary gear in the radial direction and configured to engage with the second planetary gear; and
a second carrier coupled to the second planetary gear;
a wheel bearing coupled to one side of the second decelerator;
a brake disc assembly disposed on one side of the second decelerator; and a fastening member configured to pass through the
second carrier and the brake disc assembly and fix
the second carrier to the brake disc assembly,
wherein the first planetary gear is disposed on an outer
surface of the first sun gear in a radial direction and
configured to engage with the first sun gear, and
wherein the first decelerator further comprises a first
ring gear disposed on an outer surface of the first
planetary gear in the radial direction, the first ring
gear configured to engage with the first planetary
gear.

* * * * *